US012652513B2

(12) United States Patent
    Zhu et al.

(10) Patent No.: US 12,652,513 B2
(45) Date of Patent: Jun. 9, 2026

(54) COMMUNICATING METHOD AND SYSTEM FOR VEHICLE USERS

(71) Applicant: FAURECIA CLARION ELECTRONICS (XIAMEN) CO., LTD., Xiamen (CN)

(72) Inventors: Fubin Zhu, Xiamen (CN); Hengqiang Zhang, Xiamen (CN)

(73) Assignee: FAURECIA CLARION ELECTRONICS (XIAMEN) CO., LTD., Xiamen (CN)

( * ) Notice: Subject to any disclaimer, the term of this patent is extended or adjusted under 35 U.S.C. 154(b) by 269 days.

(21) Appl. No.: 18/458,983

(22) Filed: Aug. 30, 2023

(65) Prior Publication Data

US 2024/0080646 A1     Mar. 7, 2024

(30) Foreign Application Priority Data

Aug. 30, 2022    (CN) .......................... 202211046952.8

(51) Int. Cl.
    *H04W 4/48*       (2018.01)
    *B60R 16/023*     (2006.01)
    *H04W 4/02*       (2018.01)
    *H04W 4/029*      (2018.01)

(52) U.S. Cl.
    CPC ............... *H04W 4/48* (2018.02); *H04W 4/02* (2013.01); *H04W 4/029* (2018.02); *B60R 16/023* (2013.01)

(58) Field of Classification Search
    None
    See application file for complete search history.

(56) References Cited

U.S. PATENT DOCUMENTS

| | | | | |
|---|---|---|---|---|
| 6,917,801 | B2 * | 7/2005 | Witte ................. | G07C 9/00857 |
| | | | | 455/418 |
| 2007/0135061 | A1 * | 6/2007 | Buck ..................... | H04M 9/001 |
| | | | | 455/99 |
| 2008/0076483 | A1 * | 3/2008 | Shim ................... | H04M 1/6091 |
| | | | | 455/569.2 |
| 2013/0086164 | A1 * | 4/2013 | Wheeler ............... | H04W 4/023 |
| | | | | 709/204 |
| 2015/0341757 | A1 * | 11/2015 | Mannikka ............... | H04L 67/12 |
| | | | | 455/456.2 |
| 2023/0106673 | A1 * | 4/2023 | Asghar ................. | B60K 35/28 |
| | | | | 382/104 |
| 2025/0209834 | A1 * | 6/2025 | Asghar ................. | B60K 35/28 |

* cited by examiner

*Primary Examiner* — Adolf Dsouza
(74) *Attorney, Agent, or Firm* — Kilpatrick Townsend & Stockton LLP

(57)                    ABSTRACT

A communicating method includes following steps: establishing a communicating area with respect to the vehicle, and defining a coordinate range of the communicating area; connecting at least one user terminal, and acquiring a personal coordinate from each of the user terminals; and responding to the personal coordinates of user terminals being located in the coordinate range of the communicating area at the same time, to establish information correlation for each user terminal located in the communicating area.

18 Claims, 10 Drawing Sheets

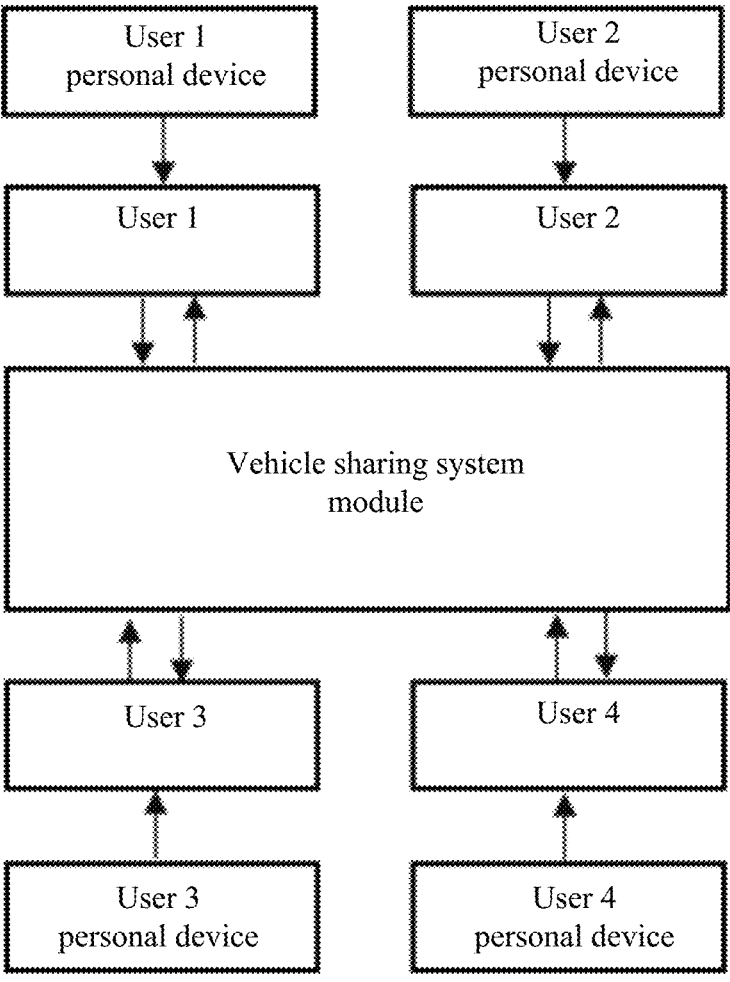
Fig.    1

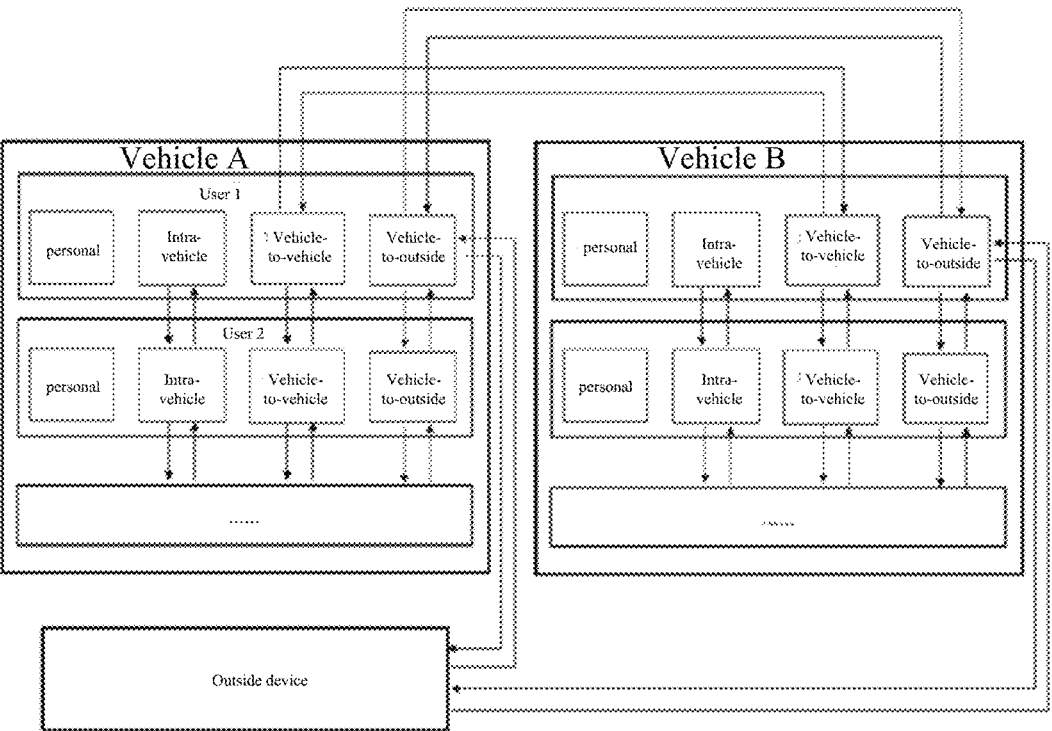
Fig.    2

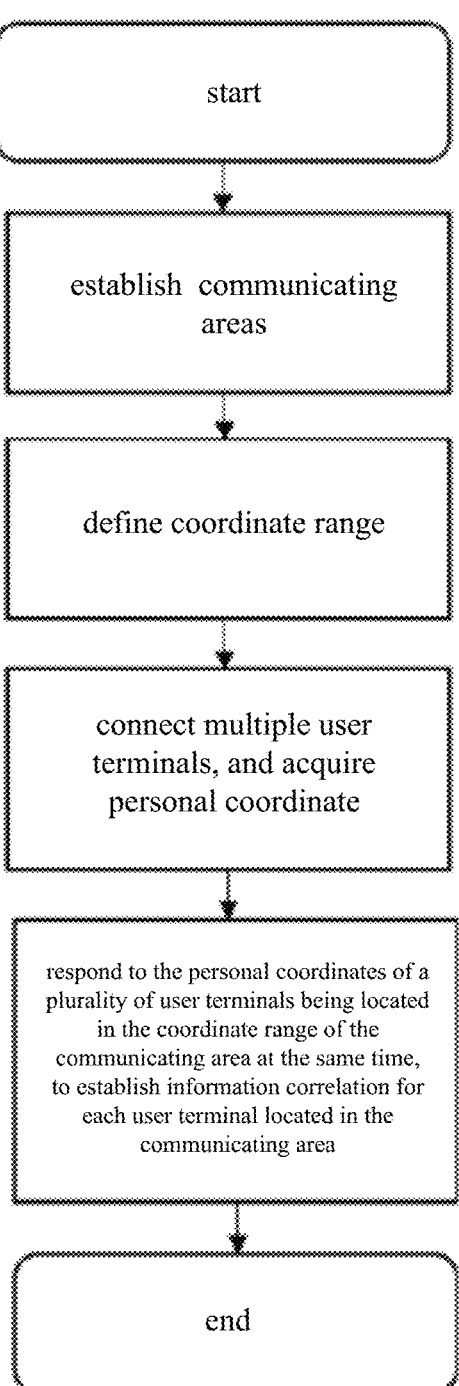
Fig.    3

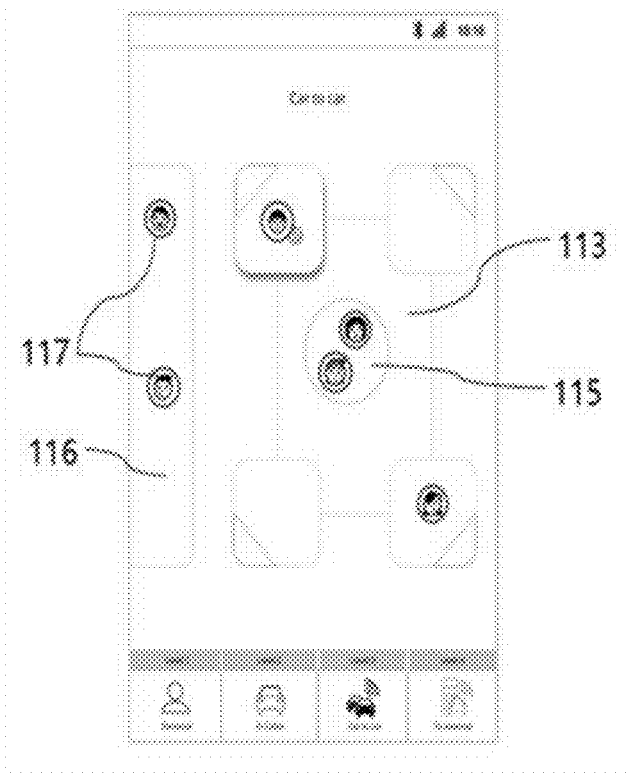
Fig.     4C
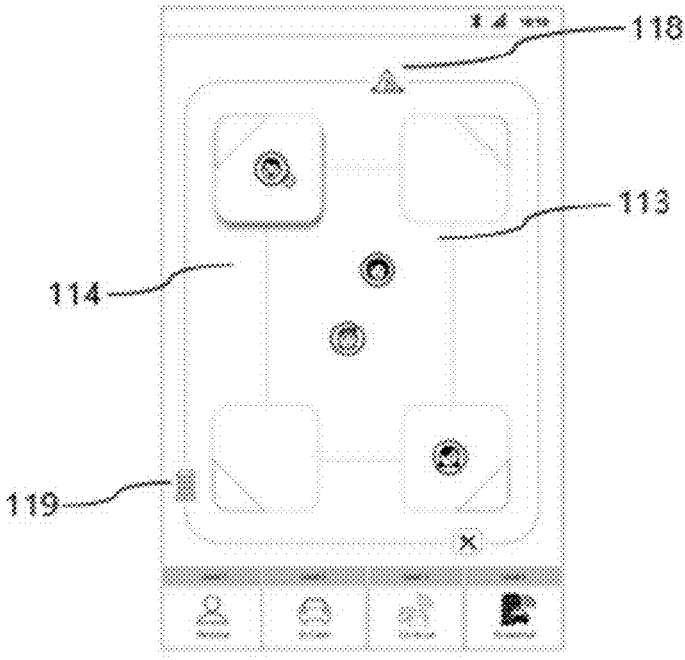
Fig.     4D

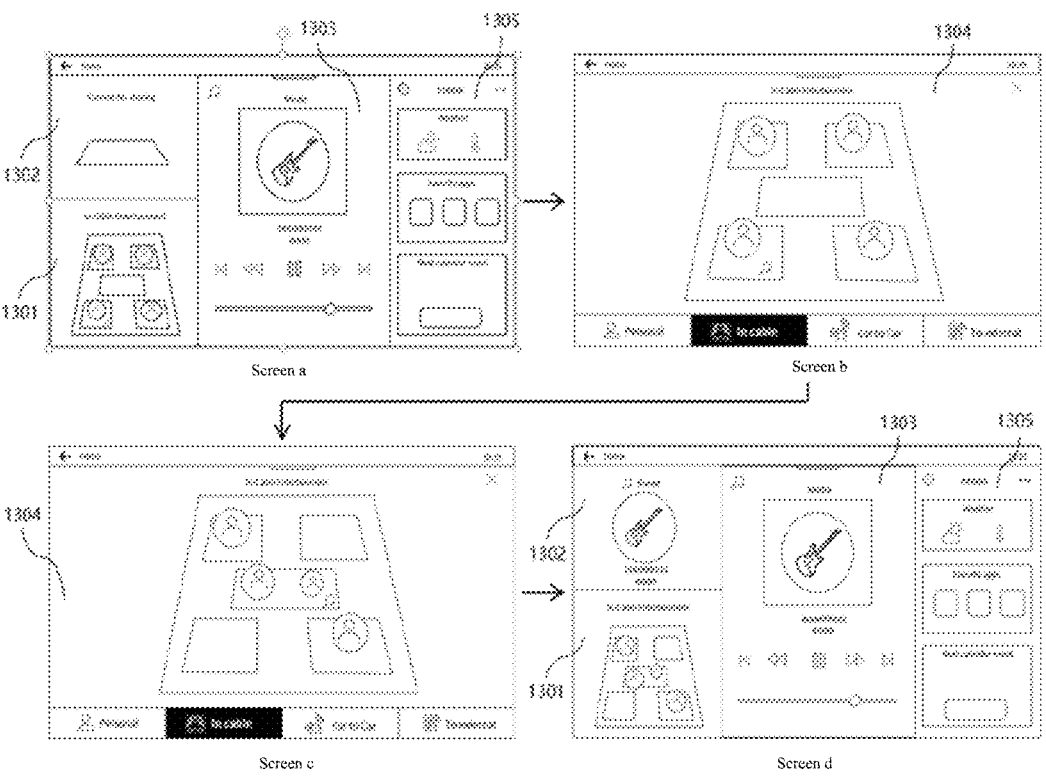
Fig.    5

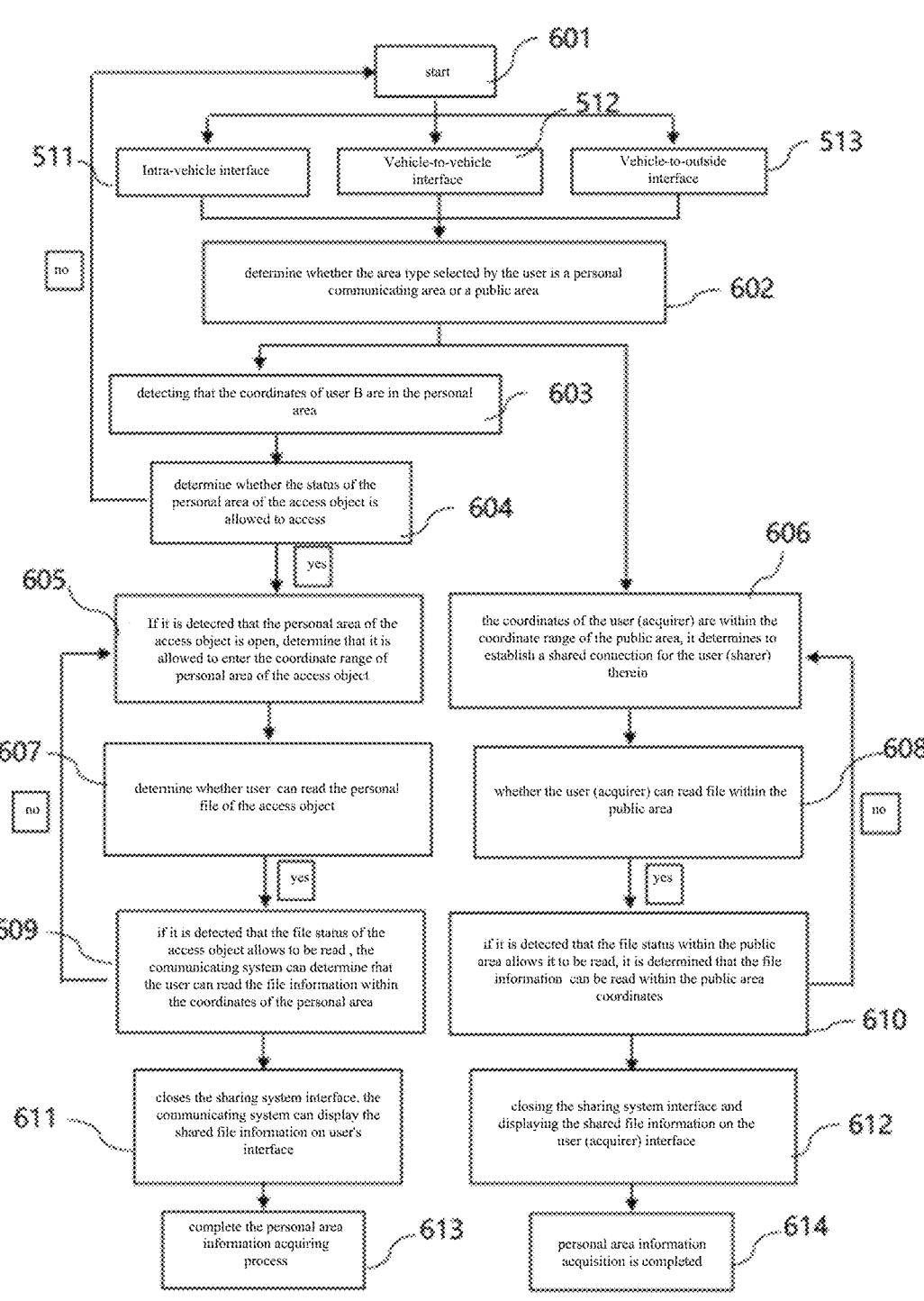
Fig.     7

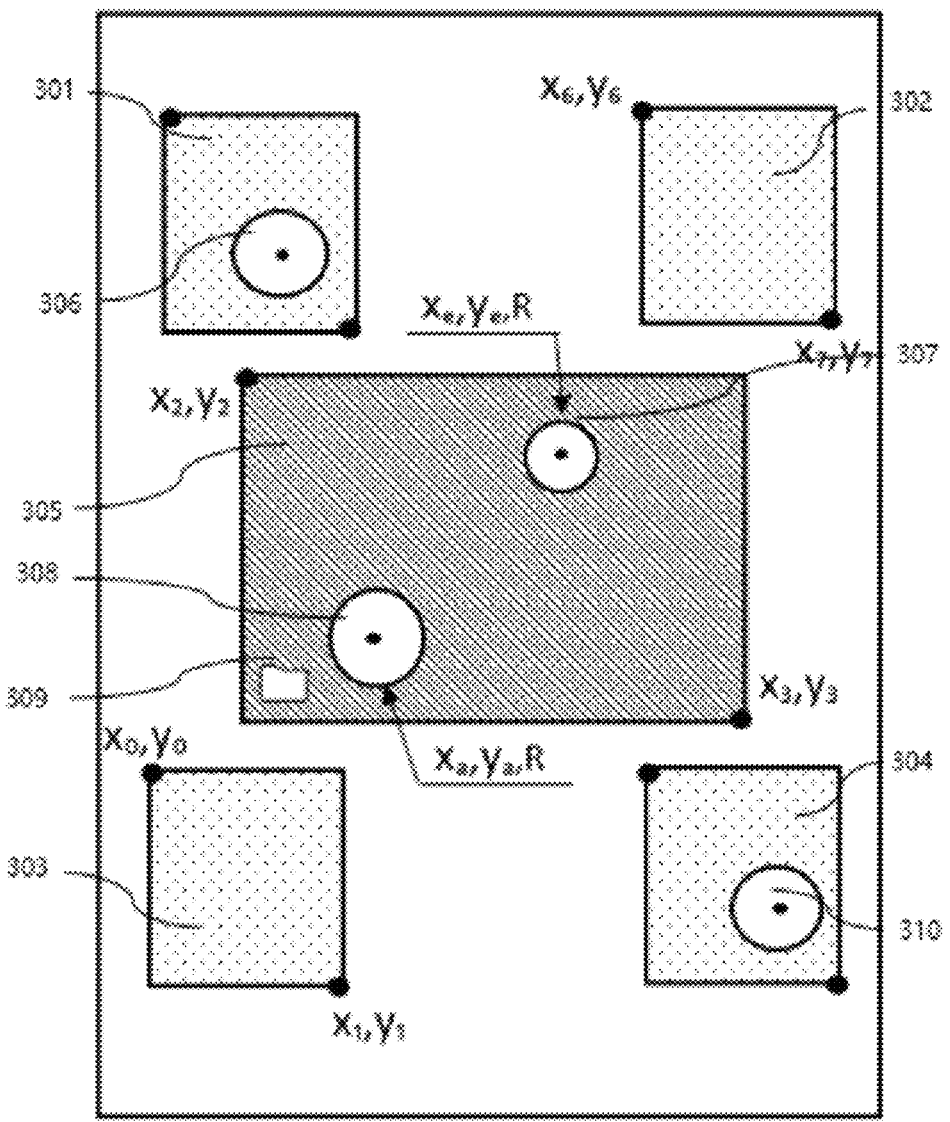
Fig.    8A

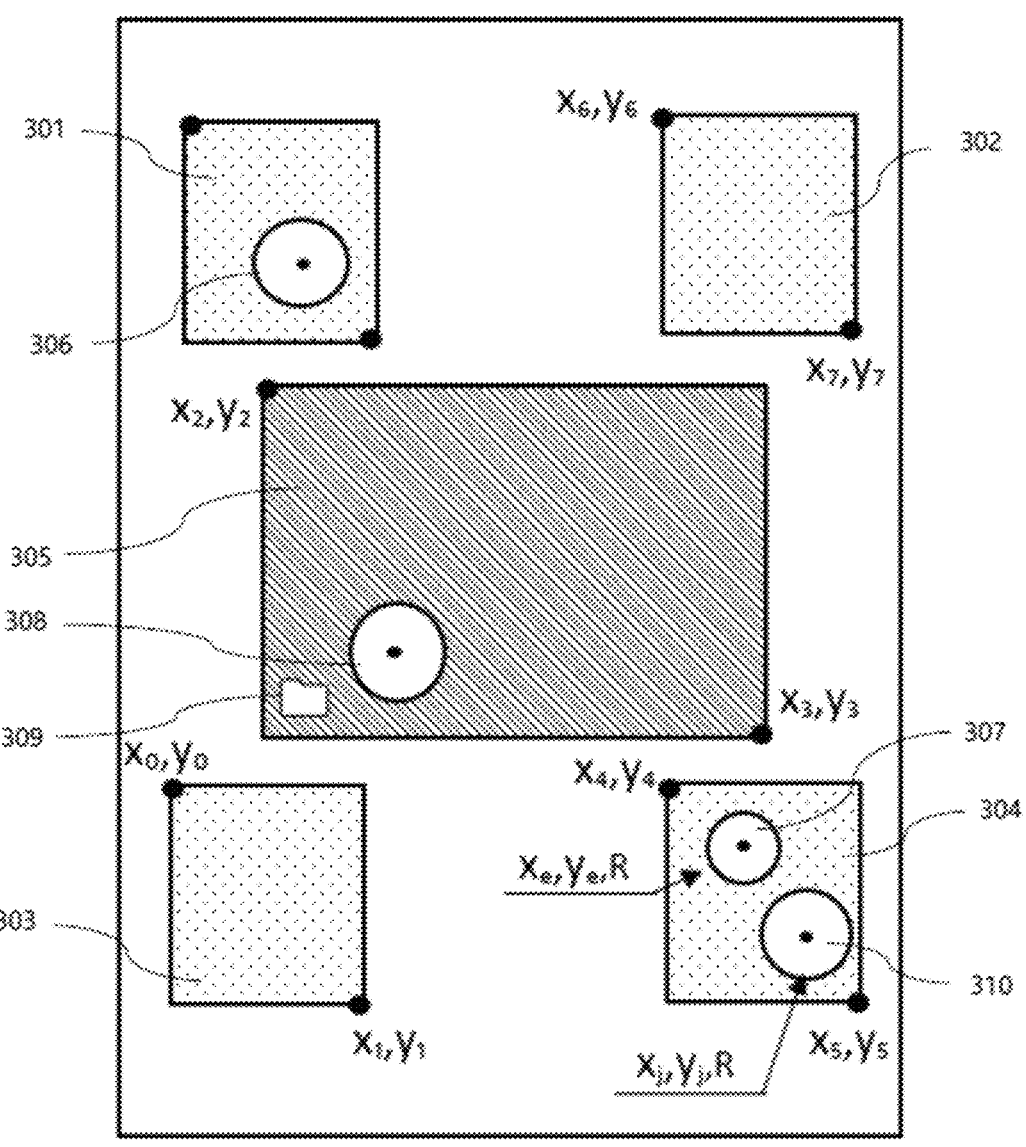
F i g.      8B

COMMUNICATING METHOD AND SYSTEM FOR VEHICLE USERS

FIELD

The present disclosure relates to vehicle telecommunication technology, in particular to a communicating method for vehicle users, a communicating system for vehicle users, and a computer-readable storage medium.

BACKGROUND

During vehicle driving, people inside the vehicle generally need to share and read information. However, due to limitations of cabin space and seat as barriers, it is currently inconvenient to communicate between the front and rear row passengers of the vehicle, and there are obstacles to information interaction among people inside the vehicle. Under normal circumstances, in-vehicle infotainment of the vehicle is mainly controlled by the driver, while it is difficult for other people to participate in the entertainment settings in the cabin, and they can only use personal mobile terminal such as cell phone and social networking software other than the in-vehicle infotainment to realize information interaction. On the one hand, this information interaction method is dumb and lacks dynamics. On the other hand, it has problems of wasting mobile data and high costs, and it cannot maintain stability in areas with weak base station signals such as the wild, tunnels, and underground parking lots.

In order to overcome the defects of the existing technology, a communicating technology for vehicle users is urgently needed in the field, building a virtual communicating area based on connecting in-vehicle infotainment and personal mobile terminal, and vehicle users can freely act and communicate in the virtual communicating area, to improve the freedom, convenience, reliability and fun of communication.

SUMMARY

A brief overview of embodiments is provided below to provide a basic understanding of these aspects. The summary is not an exhaustive overview of all aspects envisaged, and is neither intended to identify the key or decisive elements of all aspects nor to attempt to define the scope of any or all aspects. The sole purpose of the summary is to present some concepts of one or more aspects in a simplified form as a prelude to the more detailed description that is presented later.

In order to overcome the defects of the existing technology, the present disclosure provides a communicating method for vehicle users, a communicating system for vehicle users, and a computer-readable storage medium, used to build a virtual communicating area based on connecting in-vehicle infotainment and personal mobile terminal, and vehicle users can freely act and communicate in the virtual communicating area, to improve the freedom, convenience, reliability and fun of communication.

In some embodiments, the communicating method for vehicle users provided according to the first aspect of the disclosure includes the following steps: establishing a communicating area with respect to the vehicle, and defining a coordinate range of the communicating area; connecting at least one user terminal, and acquiring a personal coordinate from each of the user terminals; and responding to the personal coordinates of user terminals being located in the coordinate range of the communicating area at the same time, to establish information correlation for each user terminal located in the communicating area.

Further, in some embodiments of the present disclosure, step of establishing a communicating area with respect to the vehicle, and defining a coordinate range of the communicating area includes: detecting at least one user terminal connected to the vehicle; establishing personal communicating area for each of the user terminals connected to the vehicle, and defining a first coordinate range of the personal communicating area; and acquiring access permission information via each user terminal to determine the access permission of corresponding personal communicating area.

Further, in some embodiments of the present disclosure, after establishing personal communicating area, and determining the access permission of the personal communicating area, the communicating method further includes: responding to an access request acquired from a second user terminal to personal communicating area of a first user terminal, determining whether to allow the second user terminal to access the personal communicating area according to the access permission of the personal communicating area; and responding to a determination result that the second user terminal is allowed to access the personal communicating area, personal coordinate of the second user terminal being moved to within the first coordinate range.

Further, in some embodiments of the present disclosure, step of establishing a communicating area with respect to the vehicle, and defining a coordinate range of the communicating area includes: establishing an intra-vehicle communicating area of the vehicle, and defining a second coordinate range of the intra-vehicle communicating area.

Further, in some embodiments of the present disclosure, after establishing the intra-vehicle communicating area, the communicating method further includes: responding to an access request acquired from a third user terminal to the intra-vehicle communicating area, determining whether the third user terminal is located inside the vehicle according to communicating interface between the third user terminal and the vehicle; and responding to a determination result that the third user terminal is located inside the vehicle, personal coordinate of the third user terminal being moved to within the second coordinate range.

Further, in some embodiments of the present disclosure, step of establishing a communicating area with respect to the vehicle, and defining a coordinate range of the communicating area further includes: establishing an inter-vehicle communicating area of the vehicle, and defining a third coordinate range of the inter-vehicle communicating area.

Further, in some embodiments of the present disclosure, after establishing the inter-vehicle communicating area, the communicating method further includes: responding to an access request acquired from a fourth user terminal to the inter-vehicle communicating area, determining whether the fourth user terminal is located inside the vehicle according to communicating interface between the fourth user terminal and the vehicle; and responding to a determination result that the fourth user terminal is located inside the vehicle, acquiring access permission information via at least one terminal in the vehicle, to determine whether to allow the fourth user terminal to access the inter-vehicle communicating area; and responding to determination result that the fourth user terminal is allowed to access the inter-vehicle communicating area, personal coordinate of the fourth user terminal being moved to within the third coordinate range.

Further, in some embodiments of the present disclosure, after determining whether the fourth user terminal is located inside the vehicle, the communicating method further includes: responding to a determination result that the fourth user terminal is located inside the vehicle, personal coordinate of the fourth user terminal being moved to within the third coordinate range.

Further, in some embodiments of the present disclosure, the fourth user terminal located outside the vehicle is selected from at least one of an in-vehicle infotainment of another vehicle, a client, a server, a road terminal, and a place terminal outside the vehicle.

Further, in some embodiments of the present disclosure, step of to establish information correlation for each user terminal located in the communicating area includes: responding to a voice call request provided by any of the user terminals located in the communicating area, establishing a voice communicating channel between the user terminal and the target terminal located in the communicating area corresponding to the voice call request; and responding to a video call request provided by any of the user terminals located in the communicating area, a video communicating channel is established between the user terminal and the target terminal located in the communicating area corresponding to the video call request.

Further, in some embodiments of the present disclosure, step of to establish information correlation for each user terminal located in the communicating area includes: acquiring personal file and the read permission authority of the personal file from each user terminal; displaying personal file permitted to read of other user terminal(s) to each user terminal located in the communicating area according to the read permission authority; and responding to a file acquiring request provided by any one of the user terminals located in the communicating area, corresponding personal file that is permitted to be read being shared to the user terminal.

Further, in some embodiments of the present disclosure, the communicating method further includes following steps: displaying icon of a corresponding user in the corresponding communicating area according to the personal coordinate of the user terminal; and acquiring an operating instruction of the corresponding user on the icon via the user terminal, to change the personal coordinate of the user terminal.

Further, in some embodiments of the present disclosure, the communicating method further includes following steps: acquiring a communicating range instruction via the user terminal; and displaying one or more communicating area according to the communicating range instruction.

In addition, the communicating system for vehicle users provided according to the second aspect of the present disclosure includes a memory and a processor. The processor is connected to the memory and configured to implement the communicating method for vehicle users provided in the first aspect of the present disclosure.

In addition, the computer-readable storage medium provided according to the third aspect of the present disclosure, in which computer instructions are stored. When the computer instructions are executed by a processor, the communicating method for vehicle users provided in the first aspect of the present disclosure is implemented.

DESCRIPTION OF ATTACHED DRAWINGS

The above embodiments of the present disclosure will be better understood after reading the detailed description of the embodiments of the present disclosure in conjunction with the following figures. In the figures, components are not necessarily drawn to scale, and components having similar related features may have the same or similar reference numerals.

FIG. 1 shows a schematic diagram of information interaction between each user terminal of vehicle users and an intra-vehicle sharing system according to some embodiments of the present disclosure.

FIG. 2 shows an architectural diagram of a communicating system for vehicle users provided in accordance with some embodiments of the present disclosure.

FIG. 3 shows a flow chart of a communicating method for vehicle users provided according to some embodiments of the present disclosure.

FIG. 4A to FIG. 4D show schematic diagrams of graphical user interface of communicating system for vehicle users provided according to some embodiments of the present disclosure.

FIG. 5 shows a schematic diagram of a user application scenario interface provided according to some embodiments of the present disclosure.

FIG. 7 shows a flow chart of acquiring shared files according to some embodiments of the present disclosure.

FIG. 8A and FIG. 8B show schematic diagrams of a graphical user interface for sharing and acquiring files provided according to some embodiments of the present disclosure.

DETAILED DESCRIPTION OF EMBODIMENTS

Figure 4A:
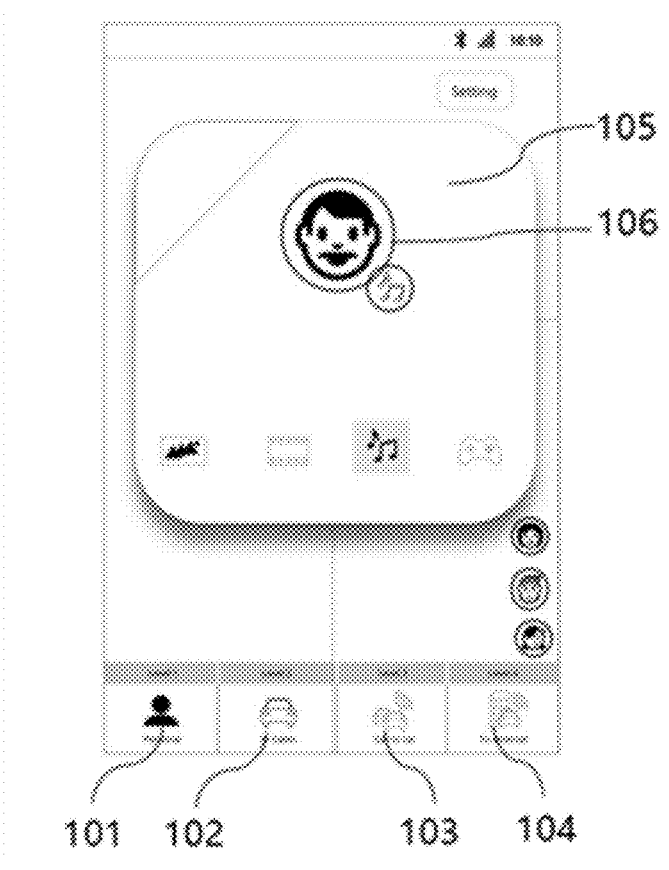

The implementations of the present disclosure are described below by specific embodiments. Embodiment of the present disclosure from the contents disclosed in the description. Although the description of the present disclosure is introduced together with other embodiments, it does not mean that the features of the present disclosure are limited to the embodiments. On the contrary, the purpose of introducing the present disclosure in combination with the embodiments is to cover other embodiments that may be extended based on the claims of the present disclosure. In order to provide a deep understanding of the present disclosure, the following description will contain many specific details. The present disclosure can also be implemented without using these details. In addition, in order to avoid confusion or ambiguity of the key points of the present disclosure, some specific details are omitted in the description.

In the description of the present disclosure, it should be noted that, unless otherwise specified and defined, the terms "installation", "connecting" and "connection" should be understood in a broad sense. For example, they can be fixed connection, removable connection or integrated connection; mechanical connection or electrical connection; as well as direct connection, indirect connection through intermediate media or internal connection of two components. The specific meaning of the above terms in the present disclosure can be understood in specific cases.

In addition, the words "up", "down", "left", "right", "top", "bottom", "horizontal" and "vertical" used in the following description should be understood as the orientation shown in this paragraph and the relevant drawings. This relative term is only for convenience of explanation, and does not mean that the described device needs to be manufactured or operated in a specific direction, so it should not be understood as a limitation of the present disclosure.

It is understood that although the terms "first", "second", "third", etc. can be used here to describe various components, regions, layers and/or parts, these components, regions, layers and/or parts should not be limited by these terms, and these terms are only used to distinguish different components, regions, layers and/or parts. Therefore, a first component, area, layer and/or part discussed below can be referred to as a second component, area, layer and/or part without departing from some embodiments of the present disclosure.

As mentioned above, because of limitations of cabin space and seat as barriers, it is currently inconvenient to communicate between the front and rear row passengers of the vehicle, and there are obstacles to information interaction among people inside the vehicle. Under normal circumstances, in-vehicle infotainment of the vehicle is mainly controlled by the driver, while it is difficult for other people to participate in the entertainment settings in the cabin, and they can only use personal mobile terminal such as cell phone and social networking software other than the in-vehicle infotainment to realize information interaction. On the one hand, this information interaction method is dumb and lacks dynamics. On the other hand, it has problems of wasting mobile data and high costs, and it cannot maintain stability in areas with weak base station signals such as the wild, tunnels, and underground parking lots.

In order to overcome the defects of the existing technology, the present disclosure provides a communicating method for vehicle users, a communicating system for vehicle users, and a computer-readable storage medium, used to build a virtual communicating area based on connecting in-vehicle infotainment and personal mobile terminal, and vehicle users can freely act and communicate in the virtual communicating area, to improve the freedom, convenience, reliability and fun of communication.

In some non-limiting embodiments, the communicating method for vehicle users provided in the embodiments of the present disclosure can be implemented through the communicating system for vehicle users provided in the embodiments of the present disclosure. In one embodiment, the communicating system is configured with a memory and a processor. The memory includes, but is not limited to the computer-readable storage medium provided in the embodiments of the present disclosure, in which computer instructions are stored. The processor is connected to the memory and is configured to execute the computer instructions stored on the memory to implement the communicating method for vehicle users provided in the embodiments of the present disclosure.

Further, please refer to FIG. 1 and FIG. 2 in conjunction. FIG. 1 shows a schematic diagram of information interaction between each user terminal of vehicle users and an intra-vehicle sharing system according to some embodiments of the present disclosure. FIG. 2 shows an architectural diagram of a communicating system for vehicle users provided in accordance with some embodiments of the present disclosure.

As shown in FIG. 1 and FIG. 2, in some embodiments, the communicating system further includes an intra-vehicle communicating module, a vehicle-to-vehicle communicating module and/or a vehicle-to-outside communicating module. The intra-vehicle communicating module can be realized according to intra-vehicle network technology, communicating with at least one user terminal located inside the vehicle, to provide a function of personal communicating between a user terminal to the in-vehicle infotainment and/or a function of communicating among multiple user terminals. The vehicle-to-vehicle communicating module and/or a vehicle-to-outside communicating module can be realized according to Internet of Vehicle (IOV) technology, communicating with the in-vehicle infotainment of at least one outside vehicle and/or at least one user terminal outside the vehicle, to provide a function of vehicle-to-vehicle communicating as communicating between the at least one outside vehicle and user terminal inside the vehicle and/or a function of vehicle-to-outside communicating, as communicating between multiple user terminals outside the vehicle and user terminal inside the vehicle.

The working principle of the above communicating system will be described below in conjunction with some embodiments of communicating methods. The embodiments of these communicating methods only provide some non-limiting implementations of the present disclosure, which is intended to clearly display the main idea of the present disclosure, and provide some specific proposals that are convenient for the public to implement, rather than limiting all functions or all working modes of the communicating system. Similarly, the communicating system is only a non-limiting embodiment provided by the present disclosure, and does not limit the implementation subject to each step in these communicating methods.

Please refer to FIG. 3, FIG. 3 shows a flow chart of a communicating method for vehicle users provided according to some embodiments of the present disclosure.

As shown in FIG. 3, during the communicating process among vehicle users, the communicating system can first establish one or more communicating areas and define coordinate range of each communicating area, to divide coordinate ranges for the different functions and access permissions of each communicating area. Please refer specifically to FIGS. 4A to 4D, which are schematic diagrams of graphical user interface of communicating system for vehicle users provided according to some embodiments of the present disclosure.

For example, in the embodiment shown in FIG. 4A, the communicating system can first detect at least one user terminal such as a cell phone or a tablet connected to the vehicle via the intra-vehicle communicating module, and then establish personal communicating areas 105, 107, 109, 111 for each user terminal connected to the vehicle respectively, and define a first coordinate range for each personal communicating area. After that, the communicating system can send a request to acquire access permission information to the corresponding user terminal, and determine the access permission to the communicating areas 105, 107, 109 for each user terminal of other user terminal(s) according to the access permission information such as the access blacklist and the access whitelist returned by the user terminal.

Figure 4B:
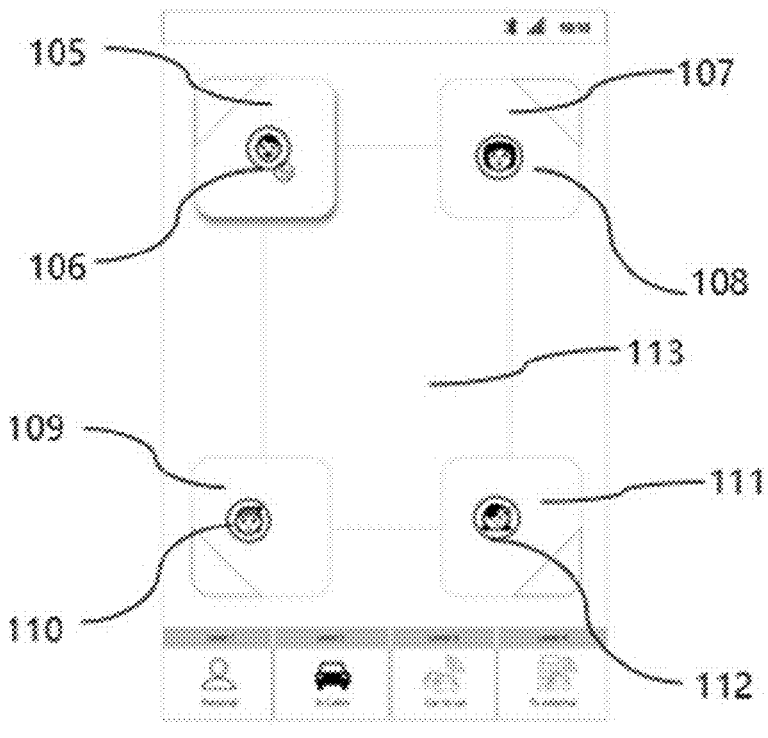

For another example, in the embodiment shown in FIG. 4B, the communicating system can establish an intra-vehicle communicating area 113 of the vehicle, and define a second coordinate range of the intra-vehicle communicating area 113, and the people inside the vehicle can freely use their user terminals to. enter the intra-vehicle communicating area 113 and freely communicate with other people inside the vehicle therein.

For another example, in the embodiment shown in FIG. 4C and FIG. 4D, the communicating system can establish a first inter-vehicle communicating area 116 with another vehicle, and/or a second inter-vehicle communicating area 114 with at least one of client, server, road terminal, and place terminal, and define a third coordinate range of for inter-vehicle communicating areas 114, 116 respectively. Afterwards, the communicating system can determine whether the user terminal is located inside the vehicle according to communicating interface between the user terminal and the vehicle, and the people inside the vehicle can use their user terminals to freely enter the communicating areas 114, 116 outside the vehicle, and freely communicate with other authorized users therein. In addition, the communicating system can also send a request to obtain access permission information to at least one terminal inside the vehicle, such as cell phone of the owner, cell phone of the driver, cell phone of the passengers inside the vehicle, and the central console of the vehicle, and according to access information such as the access blacklist and access whitelist returned by these user terminals, determine access permissions of each user terminal outside the vehicle to the inter-vehicle communicating areas 114 and 116.

Further, as shown in FIG. 4C, responding to a group communicating request jointly initiated by multiple user terminals, the communicating system can also establish a group communicating area 115 within the second coordinate range of the above-mentioned intra-vehicle communicating area 113, and define a coordinate range for the group communicating area 115, and distribute access permissions for the user terminals that jointly initiate the group communicating request. In this way, the corresponding authorized user can use his\her own user terminal to freely enter the group communicating area 115 and communicate freely with other group members therein.

Further, as shown in FIG. 3 and FIG. 4A to FIG. 4D, after establishing the communicating area, defining its coordinate range and setting its access permission, the communicating system can also acquire its personal coordinates from each user terminal connected to the in-vehicle infotainment, and display personal icons 106, 108, 110, and 112 of corresponding users in the corresponding communicating area according to the personal coordinate of the user terminal. Afterwards, the communicating system can also acquire an operating instruction of the corresponding user on the personal icon via the user terminal, and change the personal coordinate of the user terminal according to the operating instruction.

For example, as shown in FIG. 4B, responding to the operating instruction of a second user dragging its icon 108 to a first user's personal communicating area 105, the communicating system can determine to acquire an access request to personal communicating area 105 of the first user terminal from the second user terminal. At this time, the communicating system can determine whether to allow the second user terminal to access the personal communicating area 105 based on the access permission information such as the access whitelist and the access blacklist of the personal communicating area 105. If the determination result indicates that the second user terminal has access permission, the communicating system can move the personal coordinate of the second user terminal (the coordinate of the icon 108) to the first coordinate range of the personal communicating area 105. On the contrary, if the determination result indicates that the second user terminal does not have access permission, the communicating system can maintain the original coordinate of the second user terminal.

For another example, as shown in FIG. 4B, responding to the operating instruction of a third user dragging its icon 110 to the intra-vehicle communicating area 113, the communicating system can determine to acquire an access request of the third user terminal to the intra-vehicle communicating area 113. At this time, the communicating system can determine whether the third user terminal is located inside the vehicle according to the communicating interface between the third user terminal and the vehicle. If the communicating interface between the third user terminal and the vehicle is an intra-vehicle communicating module, the communicating system can determine that the third user terminal is located inside the vehicle, and the personal coordinate of the third user terminal (the coordinate of the icon 110) is moved to within the second coordinate range of the in-car communication area 113. On the contrary, if the communicating interface between the third user terminal and the vehicle is an inter-vehicle communicating module, the communicating system can determine that the third user terminal is located outside the vehicle, to determine that the third user terminal does not have access permission, and maintain the original coordinates of the third user terminal.

For another example, as shown in FIGS. 4C and 4D, responding to the operating instruction of a fourth user dragging its icon 112 to the inter-vehicle communicating areas 114 and 116, the communicating system can determine to acquire access requests to the inter-vehicle communicating areas 114 and 116 from the fourth terminal. At this time, the communicating system may first determine whether the fourth user terminal is located inside the vehicle according to the communicating interface between the fourth user terminal and the vehicle. If the determination result indicates that the fourth user terminal is located inside the vehicle, the communicating system can directly determine that the fourth user terminal has the authority to access the inter-vehicle communicating areas 114 and 116, and the personal coordinate of the fourth user terminal (coordinate of icon 112) is moved to the third coordinate range of the corresponding inter-vehicle communicating areas 114, 116. Conversely, if the determination result indicates that the fourth user terminal is located outside the vehicle, the communicating system can determine whether the fourth terminal is allowed to access the inter-vehicle communicating areas 114, 116, according to the blacklist of each user terminal inside the vehicle, and/or the whitelist of at least one user terminal inside the vehicle. Here, the fourth user terminal outside the vehicle includes but is not limited to clients such as in-vehicle infotainment of another vehicle, a mobile phone connected to the vehicle via the in-vehicle infotainment of another vehicle, a tablet computer, a handheld computer, a notebook computer, a personal computer, a smart bracelet, a smart watch and smart glasses, cloud servers of the Internet of Vehicles, road terminals such as traffic lights, monitoring, on-street parking charging piles, roadside charging piles and other road terminals, as well as place terminals such as parking charging piles, self-service refueling machines, automatic car washing machines, parking lot gates, three-dimensional garage, vehicle shuttle restaurant ordering machine, etc. Afterwards, responding to the determination result that the fourth user terminal is allowed to access the inter-vehicle communicating areas 114, 116, the communicating system can move the personal coordinates of the fourth user terminal (that is, the coordinates of the icon 117 and/or the icon 118, 119) to the third coordinate range. Conversely, responding to the determination result that the fourth user terminal is not allowed to access the communicating areas 114, 116, the communicating system can determine that the fourth user terminal does not have access permission, and maintain the original status of the fourth user terminal. coordinate.

Further, for the above functions of personal communication, intra-vehicle communication, vehicle-to-vehicle communication and vehicle-to-outside communication, the communicating system can be configured with corresponding application scenario interfaces and virtual buttons 101-104 respectively. Users can switch to different application scenario interfaces by clicking virtual buttons 101-104.

Please refer to FIG. 5, which shows a schematic diagram of a user application scenario interface provided according to some embodiments of the present disclosure.

As shown in FIG. 5, in some embodiments of central console interface, tablet computer interface, and cell phone interface, in response to the startup of the user terminal, the communicating system can first display the user initial interface a, where 1301 is a small screen of a sharing system, 1302 is a small screen for a shared content, 1303 is a multimedia interface, and 1305 is a small screen for self-definition. The user can browse user status, current shared files and other information through this initial screen a, or can enter the sharing system screen b by clicking on this screen 1301. In response to the user's click operation on the sharing system small screen 1301, the communicating system can enter a sharing system screen b, and display the sharing center interface 1304 for intra-vehicle communication based on the user's click operation on the virtual button (for example, 102). Here, the sharing center interface 1304 can include the intra-vehicle communicating area 113 and the personal communicating areas 105, 107, 109, and 111 of each user inside the vehicle. Afterwards, the user can drag his or her icon on the sharing center interface 1304 and drag it to a sharing area such as the intra-vehicle communicating area 113 to enter screen c, and share his or her files with others or accept files shared by others. In response to the completion of the dragging operation, other users in the communicating area 113 can see the sharer's synchronously shared content on their own user terminal interface. After that, the user can also click the close button "x" in the upper right corner of the screen b or c to exit the sharing center and return to the user initial interface d. At this time, the user can browse the user status and the content being shared on the small screen 1301 of the sharing system and the small screen 1302 of the shared content.

As shown in FIG. 3, after determining the coordinate range of each communicating area 105, 107, 109, 111, 113-116 and the personal coordinate of each user terminal, the communicating system can determine whether the personal coordinates of each user terminal are located in the coordinate range of the same communicating area. In response to the determination result that the personal coordinates of multiple user terminals are simultaneously located in the coordinate range of the same communicating area, the communicating system can establish information correlation for each user terminal located in the communicating area. Here, the information correlation includes but is not limited to various application methods such as voice calls, video calls, and file sharing.

For example, in response to a voice call request provided by any one of user terminal 117 located in the inter-vehicle communicating area 116, the communicating system can determine the corresponding target terminal based on the voice call request, and determine whether the target terminal is also located in the inter-vehicle communicating area 116 based on its personal coordinates. In response to the determination result that the target terminal is also located in the inter-vehicle communicating area 116, the communicating system can determine that the user terminal 117 has the authority to conduct a voice call with the target terminal, to establish voice communication between the user terminal 117 and the target terminal. On the contrary, in response to the determination result that the target terminal is located outside the inter-vehicle communicating area 116, the communication system can determine that the user terminal 117 does not have the authority to conduct a voice call with the target terminal, to reject the voice call request of the user terminal 117.

For another example, in response to a video call request provided by any one of user terminal 117 located in the inter-vehicle communicating area 116, the communicating system can determine the corresponding target terminal based on the video call request, and determine whether the target terminal is also located in the inter-vehicle communicating area 116 based on its personal coordinates. In response to the determination result that the target terminal is also located within the inter-vehicle communicating area 116, the communicating system can determine that the user terminal 117 has the authority to make a video call with the target terminal, to establish video communication between the user terminal 117 and the target terminal. aisle. On the contrary, in response to the determination result that the target terminal is located outside inter-vehicle communicating area 116, the communicating system can determine that the user terminal 117 does not have the authority to make a video call with the target terminal, to reject the video call request of the user terminal 117.

For another example, in response to a file sharing request provided by any one of user terminal located in the intra-vehicle communicating area 113, the communicating system can acquire personal files and read permission of the personal files from the all other user terminals, and display read-permitted personal files of all other user terminals to the user terminal in the intra-vehicle communicating area 113 according to the read permission. Afterwards, in response to a file acquiring request provided by any one of user terminal located in the intra-vehicle communicating area 113, the communicating system can share corresponding personal file that is allowed to be read to the user terminal.

Figure 6:
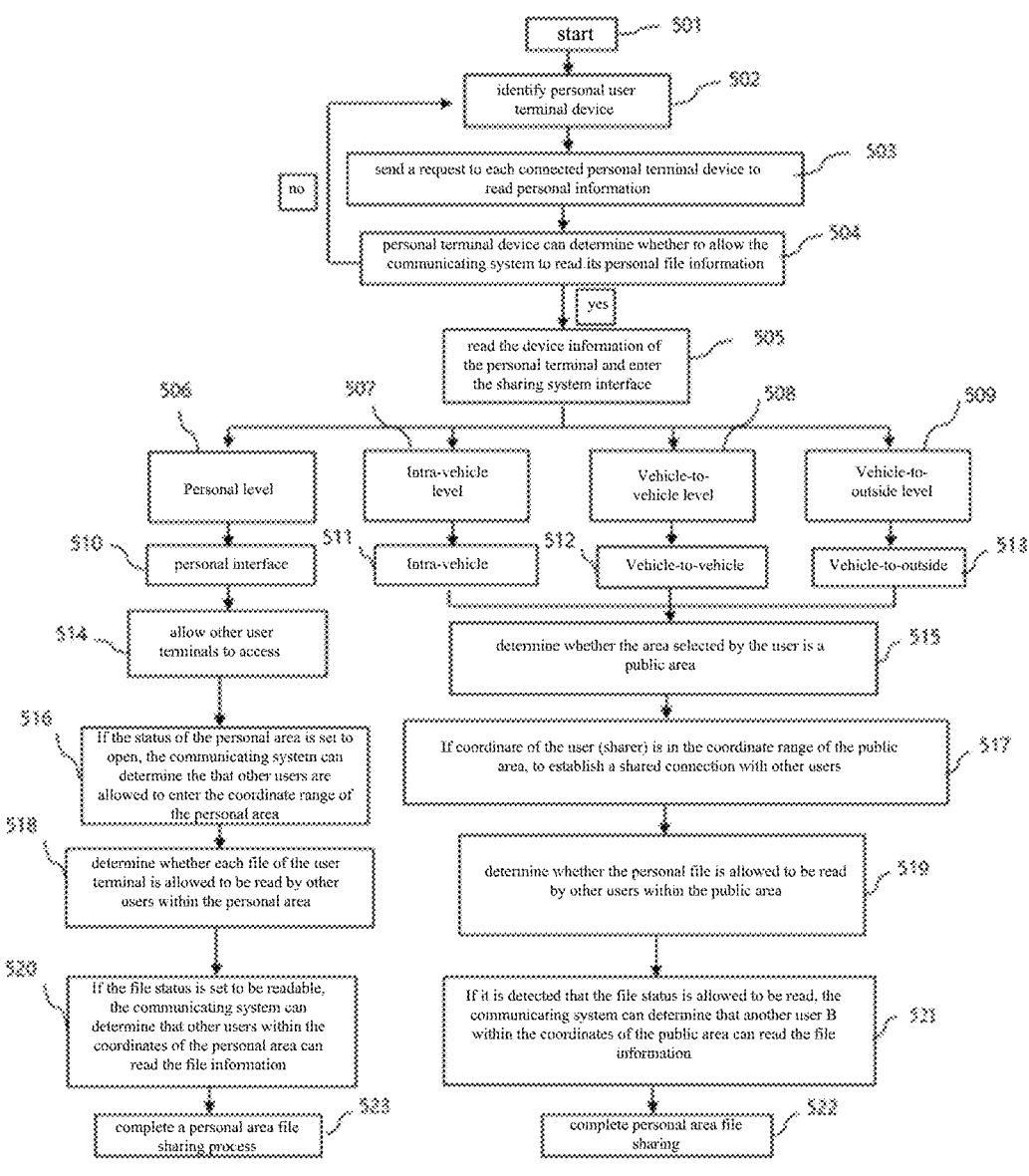
FIG. 6 shows a flow chart of sharing files according to some embodiments of the present disclosure.

Please refer to FIG. 6, FIG. 7, FIG. 8A and FIG. 8B in combination. FIG. 6 shows a flow chart of sharing files according to some embodiments of the present disclosure. FIG. 7 shows a flow chart of acquiring shared files according to some embodiments of the present disclosure. FIG. 8A and FIG. 8B show schematic diagrams of a graphical user interface for sharing and acquiring files provided according to some embodiments of the present disclosure.

As shown in FIG. 6, in the process of sharing personal files, in response to the start 501 of the communicating system, the communicating system can first identify personal user terminal device 502 connected to the in-vehicle infotainment of the vehicle, and after the identification is successful, send a request to each connected personal terminal device to read personal information 503. Afterwards, the personal terminal device can determine whether to allow the communicating system to read its personal file information 504. If it is allowed, the communicating system can read the device information of the personal terminal and enter the sharing system interface 505, to display virtual buttons of the above-mentioned the personal communicating area, the intra-vehicle communicating area, the vehicle-to-vehicle communicating area, and the vehicle-to-outside communicating area. Afterwards, in response to the user's click operation on the button of the personal communicating area, the communicating system can determine that a level instruction 506 for executing the personal communicating area has been received, to open the interface 510 of the personal communication area. Or, in response to the user's click operation on the button of the intra-vehicle communicating area, the communicating system can determine that a level instruction 507 for performing intra-vehicle communication has been received, to open the interface 511 of the intra-vehicle communicating area. In one embodiment, in response to the user's click operation on the button of the vehicle-to-vehicle communicating area, the communicating system can determine that a level instruction 508 for executing the vehicle-to-vehicle communicating area has been received, to open an interface 512 of a vehicle-to-vehicle communicating area. In one embodiment, in response to the user's click operation on the button of the vehicle-to-outside communicating area, the communicating system can determine that a level instruction 509 for performing vehicle-to-outside communication has been received, to open the interface 513 of the vehicle-to-outside communicating area.

Further, the above-mentioned level instruction 506 of the personal area corresponds to the operation 510 of displaying the personal interface. The communicating system can determine the status of the personal area in this interface, that is, determine whether to allow other user terminals to access 514. If the status of the personal area is set to open, the communicating system can determine the that other users are allowed to enter the coordinate range of the personal area 516. Otherwise other users cannot enter the personal area. Further, the communicating system can also determine whether each file of the user terminal is allowed to be read by other users within the personal area 518. If the file status is set to be readable, the communicating system can determine that other users within the coordinates of the personal area can read the file information. Otherwise, other users cannot read the file information. So far, the communicating system can complete a personal area file sharing process 523.

In addition, intra-vehicle communication level instruction 507, vehicle-to-vehicle communication level instruction 508, and vehicle-to-outside communication level instruction 509 respectively correspond to the operation 511 of displaying the intra-vehicle communicating interface, the operation 512 of displaying the vehicle-to-vehicle communicating interface, and the operation 513 of displaying the vehicle-to-outside communicating interface. The intra-vehicle communicating interface, the vehicle-to-vehicle communicating interface and the vehicle-to-outside communicating interface are all public communicating interfaces. The communicating system can determine whether the area selected by the user is a public area 515 according to coordinate of the user (sharer).

As shown in FIG. 8, when user A wants to share a file 309 to the public area 305, it can first move its icon 308 from its personal area 303 (coords=$x_0$, $y_0$, $x_1$, $y_1$) to the public area 305 (coords=$x_2$, $y_2$, $x_3$, $y_3$). At this point, user A dominates the shared content in the public area 305, and his personal file 309 will follow the icon 308 into the public area 305 (coords=$x_2$, $y_2$, $x_3$, $y_3$), and be displayed in the corner of the public area. At the same time, if user B wants to acquire files in the public area 305, he can also move its icon 307 from its personal area 302 (coords=$x_6$, $y_6$, $x_7$, $y_7$) to the public area 305 (coords=$x_2$, $y_2$, $x_3$, $y_3$). At this time, in response to detecting that user A and user B are within the same coordinate area (coords=$x_2$, $y_2$, $x_3$, $y_3$) 517, the system can automatically establish information correlation of sharing connection 516 for user A and user B. Otherwise, other users who are not located in the same public communicating area cannot establish the sharing connection with the sharer terminal.

Further, in some embodiments, in response to a user moving its icon 308 from its personal area 303 (coords=$x_0$, $y_0$, $x_1$, $y_1$) to the public area 305 (coords=$x_2$, $y_2$, $x_3$, $y_3$), the communicating system can also determine whether the personal file 309 is allowed to be read by other users within the public area 519. If it is detected that the file status is allowed to be read, the communicating system can determine that another user B within the coordinates of the public area can read the file information 521, otherwise other user B cannot read the file information. At this point, the communicating system can complete personal area file sharing 522.

In addition, as shown in FIG. 7, during the process of acquiring shared files, the communicating system can enter the intra-vehicle communicating interface 511, the vehicle-to-vehicle communicating interface 512, and the vehicle-to-outside communicating interface 513 according to the user's selection operation after the process starts 601. who. Afterwards, the communicating system can determine whether the area type selected by the user is a personal communicating area or a public area 602.

As shown in FIG. 8B, if a user B wants to acquire user D's personal files, he can move its personal icon 307 from the public area 305 (coords=$x_2$, $y_2$, $x_3$, $y_3$) to user D's personal area 304 (coords=$x_4$, $y_4$, $x_5$, $y_5$). In response to detecting that the coordinates of user B are in the personal area 603, the communicating system can determine whether the status of the personal area of the user D is allowed to access 604. If it is detected that the personal area 304 of the user D is open, the communicating system can determine that user B is allowed to enter the coordinate range 605 of user D's personal area 304. Conversely, if it is detected that the personal area 304 of the user D is closed, the communicating system can determine that the user B cannot enter the coordinate range of the user D's personal area 304.

Further, in response to detecting that both the user B and the user D are in the same personal area 304 (coords=$x_4$, $y_4$, $x_5$, $y_5$), the communicating system can also determine whether user B can read the personal file of the user D 607. If it is detected that the file status of the user D allows to be read 609, the communicating system can determine that the user B can read the file information within the coordinates of the personal area 304. On the contrary, if it is detected that the file status of the user D prohibits reading, the communicating system can determine that user B cannot read the relevant information.

Furthermore, after the user B reads the personal file information and closes the sharing system interface, the communicating system can display the shared file information on user B's interface 611, to complete the personal area information acquiring process 613.

In addition, if the communicating system detects that the coordinates of the user (acquirer) are within the coordinate range of the public area, it determines to establish a shared connection for the user (sharer) therein 606, and determines whether the user (acquirer) can read file within the public area 608, if it is detected that the file status within the public area allows it to be read, it is determined that the file information can be read within the public area coordinates 610, thereby closing the sharing system interface and displaying the shared file information on the user (acquirer) interface 612, and the personal area information acquisition is completed 614.

Likewise, when communicating with another vehicle, the communicating area expands. For example, when a user outside the car drags its icon near the vehicle, the communicating system can request the owner of the vehicle to determine whether to allow the user to access the communicating system of the vehicle. If the owner of the vehicle allows the user outside the vehicle to access, it can acquire the public space information of the vehicle through the vehicle-to-vehicle communicating area and/or the vehicle-to-outside communicating area. In addition, after the information correlation between the two vehicles is established, the people of the vehicle can also enter communicating system of the correlated vehicle to share information, and establish an instant communicating group for real-time communication.

In addition, at the level of vehicle-to-outside communication, when a user outside the vehicle dials the contact information of a user inside the vehicle, the driver of the vehicle will receive relevant information and determine whether to allow access. In response to the instruction to allow access, the communicating system can allow the user outside the vehicle to access and conduct a video or voice call with the user inside the vehicle. Furthermore, the user inside the vehicle can also return to the vehicle-to-vehicle communication level and invite other people inside the vehicle to join the video or voice call.

In summary, compared with the current vehicle communicating methods in this field, the present disclosure can build a virtual communicating area based on connecting in-vehicle infotainment and personal mobile terminal, realizing personal interface information sharing, intra-vehicle, vehicle-to-vehicle, and vehicle-to-outside information interaction, and vehicle users can freely act and communicate in the virtual communicating area, to improve the freedom, convenience, reliability and fun of communication.

Although the above methods are illustrated and described as a series of actions in order to simplify the explanation, it should be understood and appreciated that these methods are not limited by the order of actions, because according to one or more embodiments, some actions can occur in different order and/or concurrently with other actions from the illustrations and descriptions herein or not illustrated and described herein.

In some embodiments, signals and data can be represented using any of a variety of different technologies and techniques. For example, the data, instructions, commands, information, signals, bits, symbols and chips cited throughout the above description may be represented by voltage, current, electromagnetic waves, magnetic fields or magnetic particles, optical fields or optical particles, or any combination thereof.

In some embodiments, various illustrative logic blocks, modules, circuits, and algorithm steps described in the embodiments disclosed herein can be implemented as electronic hardware, computer software, or a combination of both. In order to clearly explain the interchangeability of hardware and software, various illustrative components, blocks, modules, circuits, and steps are generally described above in the form of their functionality. Whether such functionality is implemented as hardware or software depends on the specific application and design constraints imposed on the overall system. Technicians can implement the described functionality in different ways for each specific application, but such implementation decisions should not be regarded as leading to departure from the scope of the disclosure.

Although the communicating system described in the above embodiments can be implemented through a combination of software and hardware. However, it can be understood that the communicating system can also be implemented separately in software or hardware. For hardware implementation, the communicating system can be implemented in one or more application specific integrated circuits (ASICs), digital signal processors (DSPs), programmable logic devices (PLDs), field programmable gate arrays (FPGAs), processors, controllers, microcontrollers, microprocessors, other electronic devices used to perform the above functions, or a selected combination of the above devices. For software implementation, the communicating system can be implemented through independent software modules such as procedures and functions running on a universal chip, and each module performs one or more of the functions and operations described in this article.

The various illustrative logic modules and circuits described in connection with the embodiments disclosed herein can be realized or executed by general-purpose processors, digital signal processors (DSPs), application specific integrated circuits (ASICs), field programmable gate arrays (FPGAs) or other programmable logic devices, discrete gate or transistor logic, discrete hardware components or any combination thereof designed to perform the functions described herein. The general processor can be a microprocessor, but in the alternative, the processor can be any conventional processor, controller, microcontroller or state machine. The processor can also be implemented as a combination of computing devices, such as a combination of DSP and microprocessors, microprocessors, one or more microprocessors cooperating with the DSP core or any other such configuration.

The previous description of the disclosure is provided to enable understanding of the disclosure. Various modifications to the disclosure will be apparent, and the universal principles defined herein can be applied to other variants without departing from the spirit or scope of the disclosure. Therefore, this disclosure is not intended to be limited to the examples and designs described herein, but should be granted the widest scope consistent with the principles and novel features disclosed herein.

What is claimed is:

1. A communicating method for vehicle users, comprising:

establishing a communicating area with respect to the vehicle, and defining a coordinate range of the communicating area;

connecting at least one user terminal, and acquiring a personal coordinate from each of the user terminals; and responding to the personal coordinates of a plurality of user terminals being located in the coordinate range of the communicating area at the same time, to establish information correlation for each user terminal located in the communicating area;

wherein the establishing of a communicating area with respect to the vehicle, and defining a coordinate range of the communicating area comprises:

detecting at least one user terminal connected to the vehicle;

establishing personal communicating area for each of the user terminals connected to the vehicle, and defining a first coordinate range of the personal communicating area; and acquiring access permission information via each user terminal to determine the access permission to corresponding personal communicating area.

2. The communicating method according to claim 1, wherein after establishing personal communicating area, and determining the access permission of the personal communicating area, the communicating method further comprises:

responding to an access request acquired from a second user terminal to personal communicating area of a first user terminal, determining whether to allow the second user terminal to access the personal communicating area according to the access permission of the personal communicating area; and responding to a determination result that the second user terminal is allowed to access the personal communicating area, personal coordinate of the second user terminal being moved to within the first coordinate range.

3. The communicating method according to claim 1, wherein the establishing of a communicating area with respect to the vehicle, and defining a coordinate range of the communicating area comprises:

establishing an intra-vehicle communicating area of the vehicle, and defining a second coordinate range of the intra-vehicle communicating area.

4. The communicating method according to claim 3, wherein after establishing the intra-vehicle communicating area, the communicating method further comprises:

responding to an access request acquired from a third user terminal to the intra-vehicle communicating area, determining whether the third user terminal is located inside the vehicle according to communicating interface between the third user terminal and the vehicle; and responding to a determination result that the third user terminal is located inside the vehicle, personal coordinate of the third user terminal being moved to within the second coordinate range.

5. The communicating method according to claim 1, wherein the establishing of a communicating area with respect to the vehicle, and defining a coordinate range of the communicating area further comprises:

establishing an inter-vehicle communicating area of the vehicle, and defining a third coordinate range of the inter-vehicle communicating area.

6. The communicating method according to claim 5, wherein after establishing the inter-vehicle communicating area, the communicating method further comprises:

responding to an access request acquired from a fourth user terminal to the inter-vehicle communicating area, determining whether the fourth user terminal is located inside the vehicle according to communicating interface between the fourth user terminal and the vehicle; and responding to a determination result that the fourth user terminal is located inside the vehicle, acquiring access permission information via at least one terminal in the vehicle, to determine whether to allow the fourth user terminal to access the inter-vehicle communicating area; and responding to determination result that the fourth user terminal is allowed to access the inter-vehicle communicating area, personal coordinate of the fourth user terminal being moved to within the third coordinate range.

7. The communicating method according to claim 6, wherein after determining whether the fourth user terminal is located inside the vehicle, the communicating method further comprises:

responding to a determination result that the fourth user terminal is located inside the vehicle, personal coordinate of the fourth user terminal being moved to within the third coordinate range.

8. The communicating method according to claim 6, wherein the fourth user terminal located outside the vehicle is selected from at least one of in-vehicle infotainment of another vehicle, client, server, road terminal, and place terminal outside the vehicle.

9. The communicating method according to claim 1, wherein the establishing of information correlation for each user terminal located in the communicating area comprises:

responding to a voice call request provided by any of the user terminals located in the communicating area, establishing a voice communicating channel between the user terminal and a target terminal located in the communicating area corresponding to the voice call request; and responding to a video call request provided by any of the user terminals located in the communicating area, a video communicating channel is established between the user terminal and the target terminal located in the communicating area corresponding to the video call request.

10. The communicating method according to claim 1, wherein the establishing of information correlation for each user terminal located in the communicating area comprises:

acquiring personal file and a read permission authority of the personal file from each user terminal;

displaying personal file permitted to read of other user terminal(s) to each user terminal located in the communicating area according to the read permission authority; and responding to a file acquiring request provided by any one of the user terminals located in the communicating area, corresponding personal file that is permitted to be read being shared to the user terminal.

11. The communicating method according to claim 1, further comprises:

displaying icon of a corresponding user in the corresponding communicating area according to the personal coordinate of the user terminal; and acquiring an operating instruction of the corresponding user on the icon via the user terminal, to change the personal coordinate of the user terminal.

12. The communicating method according to claim 1, further comprises:

acquiring a communicating range instruction via the user terminal; and displaying one or more communicating area according to the communicating range instruction.

13. A communicating system for vehicle users, comprising:

a memory; and a processor, wherein the processor is connected to the memory and configured to:

establish a communicating area with respect to the vehicle, and defining a coordinate range of the communicating area;

connect at least one user terminal, and acquiring a personal coordinate from each of the user terminals; and respond to the personal coordinates of a plurality of user terminals being located in the coordinate range of the communicating area at the same time, to establish information correlation for each user terminal located in the communicating area;

wherein the establishing of a communicating area with respect to the vehicle, and defining a coordinate range of the communicating area comprises:

detecting at least one user terminal connected to the vehicle;

establishing personal communicating area for each of the user terminals connected to the vehicle, and defining a first coordinate range of the personal communicating area; and acquiring access permission information via each user terminal to determine the access permission to corresponding personal communicating area.

14. The communicating system according to claim 13, further comprising:

one or more of the following: an intra-vehicle network module, for communicating with at least one user terminal located inside the vehicle; or an inter-vehicle network module, for communicating with at least one user terminal located outside the vehicle.

15. A non-transitory computer-readable storage medium for vehicle users, in which computer instructions are stored, wherein when the computer instructions are executed by a processor, causes the processor to:

establish a communicating area with respect to the vehicle, and defining a coordinate range of the communicating area;

connect at least one user terminal, and acquiring a personal coordinate from each of the user terminals; and respond to the personal coordinates of a plurality of user terminals being located in the coordinate range of the communicating area at the same time, to establish information correlation for each user terminal located in the communicating area;

wherein the establishing of a communicating area with respect to the vehicle, and defining a coordinate range of the communicating area comprises:

detecting at least one user terminal connected to the vehicle;

establishing personal communicating area for each of the user terminals connected to the vehicle, and defining a first coordinate range of the personal communicating area; and acquiring access permission information via each user terminal to determine the access permission to corresponding personal communicating area.

16. The non-transitory computer-readable storage medium according to claim 15, wherein after establishing personal communicating area, and determining the access permission of the personal communicating area, the communicating method further comprises:

responding to an access request acquired from a second user terminal to personal communicating area of a first user terminal, determining whether to allow the second user terminal to access the personal communicating area according to the access permission of the personal communicating area; and responding to a determination result that the second user terminal is allowed to access the personal communicating area, personal coordinate of the second user terminal being moved to within the first coordinate range.

17. The non-transitory computer-readable storage medium according to claim 15, wherein the establishing of a communicating area with respect to the vehicle, and defining a coordinate range of the communicating area comprises:

establishing an intra-vehicle communicating area of the vehicle, and defining a second coordinate range of the intra-vehicle communicating area.

18. The non-transitory computer-readable storage medium according to claim 17, wherein after establishing the intra-vehicle communicating area, the communicating method further comprises:

responding to an access request acquired from a third user terminal to the intra-vehicle communicating area, determining whether the third user terminal is located inside the vehicle according to communicating interface between the third user terminal and the vehicle; and responding to a determination result that the third user terminal is located inside the vehicle, personal coordinate of the third user terminal being moved to within the second coordinate range.

*    *    *    *    *